US005080127A

United States Patent [19]

Herfurth

[11] Patent Number: 5,080,127
[45] Date of Patent: Jan. 14, 1992

[54] DOSING PUMP SYSTEM

[75] Inventor: Eike Herfurth, Allens, Fed. Rep. of Germany

[73] Assignee: Elkem a/s, Norway

[21] Appl. No.: 493,986

[22] Filed: Mar. 15, 1990

[30] Foreign Application Priority Data

Mar. 16, 1989 [NO] Norway ............ 891130

[51] Int. Cl.[5] ............ B01D 29/00

[52] U.S. Cl. ............ 137/268; 137/545; 137/565; 137/605

[58] Field of Search ............ 137/605, 544, 545, 565, 137/268; 123/495, 510

[56] References Cited

U.S. PATENT DOCUMENTS

| | | | |
|---|---|---|---|
| 1,996,590 | 4/1935 | Rockwell | 123/495 X |
| 2,124,989 | 7/1938 | Smith . | |
| 2,543,517 | 2/1951 | Anderson . | |
| 2,757,047 | 7/1956 | Friedmann | 137/268 |
| 3,482,597 | 12/1969 | Smith | 137/544 |
| 3,828,983 | 8/1974 | Russo | 137/268 X |
| 4,357,953 | 11/1982 | Patterson | 137/268 X |
| 4,770,150 | 9/1988 | Fraenkle et al. | 123/510 |
| 4,795,556 | 1/1989 | Brotea et al. | 123/510 X |

FOREIGN PATENT DOCUMENTS

| | | |
|---|---|---|
| 3408007 | 5/1985 | Fed. Rep. of Germany . |
| 83/04213 | 12/1983 | World Int. Prop. O. . |
| 87/01648 | 3/1987 | World Int. Prop. O. . |

OTHER PUBLICATIONS

"Fuel System Fundamentals" p. 148, *Basic Carburetion and Fuel Systems,* 1971 Petersen Publishing Company.

*Primary Examiner*—Stephen M. Hepperle
*Attorney, Agent, or Firm*—Lucas & Just

[57] ABSTRACT

The present invention relates to a self-cleaning dosing pump system for delivering a slurry of solid particles and water. The dosing pump system comprises a membrane metering pump 10 and at least one sieve 11-13, arranged at the delivery end of the pump 10.

16 Claims, 1 Drawing Sheet

DOSING PUMP SYSTEM

Figure 1:
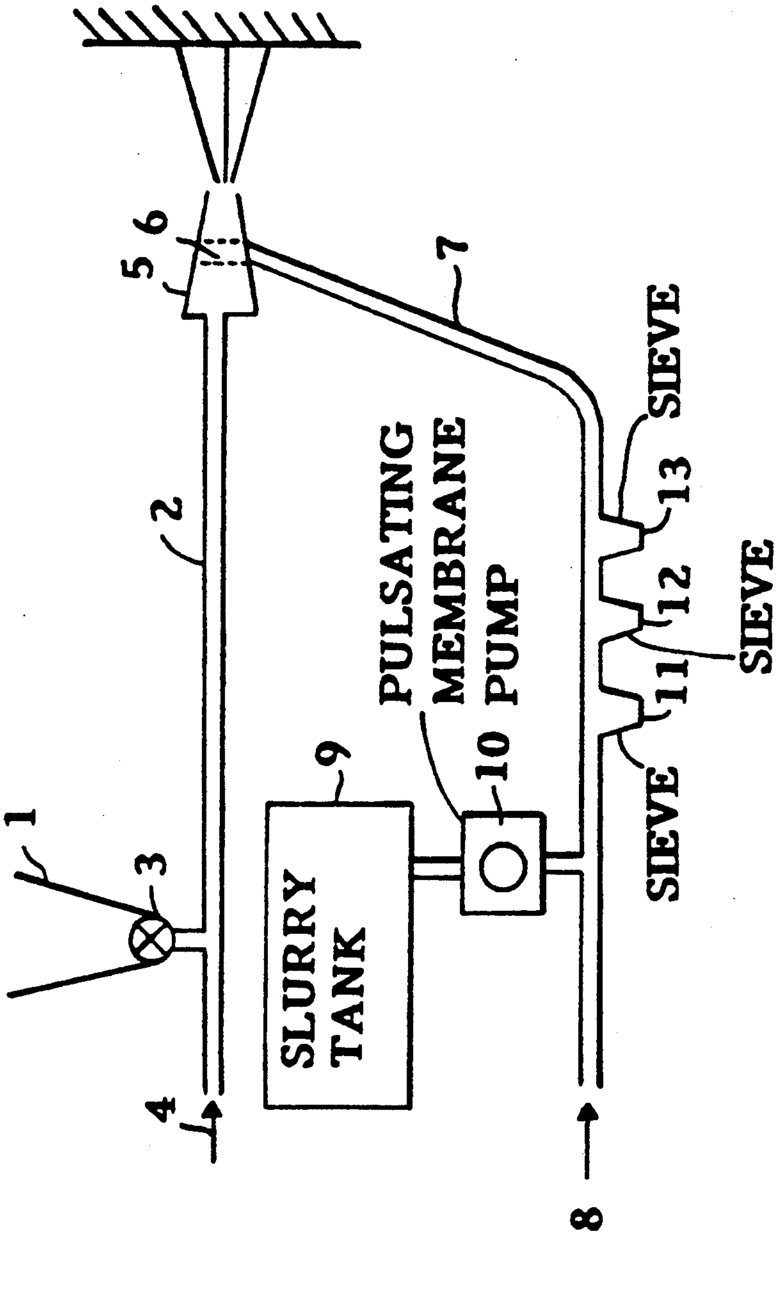

The present invention relates to a dosing pump system for pumping a slurry of solid particles and water. The invention is particularly advantageous for incorporation of a slurry of microsilica and water into a water pipe which delivers water to a spray nozzle during dry shotcreting.

From European patent application No. 88302610.6 it is known a method for dry shotcreting where microsilica is added to the water before the water is delivered to the spray nozzle. According to this method it is preferred to deliver microsilica to the water in the water pipe in the form of a slurry of microsilica and water. The microsilica consists of extremely fine, spherical silica particles containing at least 70% by weight of $SiO_2$. The specific surface area is between 15 and 30 $m^2/g$ and the particles have a diameter between 0.1 and 0.2 $\mu m$. The microsilica is obtained from the off-gases from electric furnaces for production of silicon or ferrosilicon, but can also be obtained by reduction of $SiO_2$ to SiO-gas and reoxidation of SiO in air.

In the known method, agglomerates and lumps of microsilica which have arisen during storage and handling of the microsilica slurry, or foreign coarse particles like sand grains etc., tend to clog up the holes in the water ring of the spray nozzle. The shotcreting operation then has to be terminated, the nozzle dismantled and the holes in the water ring have to be opened up. This is a time consuming operation which seriously affects the economy of using microsilica slurry in connection with the dry shotcrete method.

Further it has been experienced that when using piston pumps for adding microsilica slurry to water, the piston pump is rapidly worn out due to the abrasive nature of the microsilica particles.

It is an object of the present invention to provide a dosing pump system which solves the problems of clogging the holes in the water ring in the spray nozzle and which also solves the wear problem of the pump.

Accordingly the present invention relates to a dosing pump system for delivering a slurry of solid particles and water which system is characterized in that it comprises a membrane metering pump and at least one sieve, incorporated in the delivery pipe from the pump.

According to a preferred embodiment the system comprises at least two sieves with the coarsest sieve arranged nearest the pump and the finest sieve farthest away from the pump. The membrane metering pump used in the present invention delivers by nature a pulsating flow of slurry. The pulsating flow is responsible for breaking down any agglomerates collected in the sieves. Thus the combination of the membrane metering pump and the sieves effectively breaks down any agglomerates to individual particles. When the dosing pump system is used for delivering microsilica slurry in connection with dry shotcreting the particles leaving the finest sieve will be smaller than the holes in the water ring in the spray nozzle and clogging of the openings in the water ring is effectively prevented.

It should be appreciated that the sieves do not only stop the agglomerates in the slurry, but due to the pulsating flow of the slurry and the difference in mesh size of the different sieves, the agglomerates are broken or washed down to a size where they can flow through the sieves. Thus when the sieves are opened for inspection no agglomerates are found. Hence a selfcleaning effect is achieved by the correct arrangement of the different parts. The only particles which are permanently retained in the sieves are coarse foreign particles such as sand particles.

The pulsating flow which is delivered by the membrane pump is altered by the turbulence within the sieves to a steady and non-pulsating flow. Thus a permanent and steady flow of slurry is obtained.

A preferred embodiment of the present invention in connection with incorporation of a slurry of microsilica and water into a water pipe which delivers water to a spray nozzle during dry shotcreting will now be described in connection with the accompanying drawing where, FIG. 1 shows a flow sheet for a dry shotcrete process incorporating the dosing pump system according to the present invention.

In FIG. 1 a bin 1 for a premix of cement and sand is shown. The premix is charged from the bin 1 into a hose 2 at a predetermined rate by means of a discharge unit 3. The premix is transported through the hose 2 by means of a compressed air 4 to a nozzle 5. The nozzle 5 is equipped with a water ring 6. The water ring 6 is equipped with a number of small openings for supplying a mixture of water and microsilica to the premix which is projected through the pipe. Water is supplied to the water ring 6 through a pipe 7 which is connected to a supply of normal industrial water supply 8.

A slurry of water and microsilica contained in a tank 9 is supplied to the water pipe 7 by means of the dosing pump system according to the present invention.

The dosing pump system comprises a membrane metering pump indicated at 10. This pump which is of a conventional type, supplies pulses of slurry from tank 9 into the water pipe 7. This pulsating pumping of microsilica slurry creates a pulsating flow in the water pipe 7. In the slurry supplied to the water pipe 7 there will also normally be agglomerates of microsilica particles having an agglomerate size exceeding the opening in the water ring 6. In the water pipe 7 there is arranged three sieves 11, 12, 13. The sieves have different mesh openings. The sieve 11 has the biggest openings and the sieve 13 has the smallest, the openings in the sieve 13 being smaller than the openings in the water ring 6.

When slurry is supplied to the pipe 7 by means of the membrane pump 10, the agglomerates and lumps will be retained in the sieves 11, 12 and 13. Due to the pulsating flow created by the membrane pump 10, the agglomerates retained in the sieves 11, 12 and 13 will be broken or washed down into individual particles and these now smaller particles will flow through the sieves and to the openings in the water ring 6. Further the sieves will reduce the pulsating flow to a non-pulsating flow. The flow in the water ring 6 will then also be non-pulsating and a constant amount of water charged with microsilica slurry will be delivered through the water ring 6.

The membrane pump 10 is excellent for pumping abrasive fluids and there will be very little wear on the pump parts.

Even though three sieves are used in the above described preferred embodiment of the present invention it is within the scope of the present invention to use one, four or even more sieves.

In the above example the present invention has been described in connection with delivering a slurry of microsilica and water to the water pipe of a dry shotcrete apparatus. The invention can, however, be used for delivering any kind of slurry consisting of solid particles and a liquid where the solid particles tend to form agglomerates.

What is claimed:

1. In a dry shotcreting process wherein a nozzle is used to mix a dry cement component with water, the improvement comprising a self cleaning dosing pump system for delivering a slurry of solid particles and water to the nozzle, characterized in that the dosing pump system comprises a membrane metering pump (10) and at least one sieve (11, 13) arranged at the delivery end of the pump (10).

2. A dosing pump system according to claim 1, characterized in that the system comprises two sieves (11, 13) with the coarsest sieve arranged nearest the pump and the finest sieve arranged farthest away from the pump.

3. A dosing pump system according to claim 1 for delivering a slurry of microsilica and water in connection with a dry shotcrete process, characterized in that the sieves (11–13) are arranged in a water pipe (7) to which the slurry is delivered for admixture with water.

4. A dosing pump system according to claim 2 for delivering a slurry of microsilica and water in connection with a dry shotcrete process, characterized in that the sieves are arranged in a water pipe (7) to which the slurry is delivered for admixture with water.

5. In a dry shotcreting process wherein a dry cement component is combined with a liquid component at a nozzle the improvement comprising pumping by means of a pulsating pump a slurry component into the liquid component prior to the nozzle thereby forming a mix of slurry and liquid components; and passing said mix through at least one sieve prior to the nozzle to break up clumps which may have been introduced into the mix from the slurry.

6. The process of claim 5 wherein the liquid component is water and the slurry component is an aqueous slurry of microsilica.

7. The process of claim 5, wherein the pulsating pump is a pulsating membrane pump.

8. The process of claim 5 wherein the mix is passed through at least two sieves, a coarse sieve being arranged nearest the pump and a finer sieve being arranged farthest away from the pump.

9. The process of claim 5 wherein the dry cement component is a mix of cement and sand.

10. The process of claim 5 wherein the pulsating pump is a pulsating membrane pump; the liquid component is water; the slurry is an aqueous slurry of microsilica; and the dry cement component is a mix of cement and sand.

11. The process of claim 10 wherein the mix is passed through at least two sieves, a coarse sieve being arranged nearest the pump and a finer sieve being arranged farthest away from the pump.

12. In a dry shotcreting apparatus wherein a nozzle is used to combine a dry cement component with a liquid component and a slurry component is added to the liquid component prior to the nozzle, the improvement comprising a pulsating pump means for pumping the slurry component into said liquid component for forming a combination of the liquid and slurry components and a sieve means positioned such that the combined liquid and slurry components passes through the sieve means prior to the nozzle.

13. The apparatus of claim 12 wherein the pulsating pump means is a pulsating membrane pump.

14. The apparatus of claim 12 wherein the sieve means is at least one sieve.

15. The apparatus of claim 12 wherein the sieve means comprises two sieves, a coarse sieve arranged nearest the pump and a finer sieve arranged farthest away from the sieve.

16. The apparatus of claim 15 wherein the pulsating pump means is a pulsating membrane pump.

* * * * *